United States Patent [19]

Schaeffer

[11] 4,325,226
[45] Apr. 20, 1982

[54] REFRIGERATION SYSTEM CONDENSER HEAT RECOVERY AT HIGHER TEMPERATURE THAN NORMAL CONDENSING TEMPERATURE

[75] Inventor: Bruce S. Schaeffer, Waynesboro, Pa.
[73] Assignee: Frick Company, Waynesboro, Pa.
[21] Appl. No.: 235,404
[22] Filed: Feb. 18, 1981
[51] Int. Cl.³ .................................. F25B 7/00
[52] U.S. Cl. ..................... 62/238.6; 62/335
[58] Field of Search ............. 62/238.6, 183, 218, 62/238.1, 79, 335

[56] References Cited

U.S. PATENT DOCUMENTS

| | | | |
|---|---|---|---|
| 2,102,940 | 12/1937 | Buchanan | 237/12.4 |
| 2,191,623 | 2/1940 | Philipp | 62/218 X |
| 2,196,473 | 4/1940 | Ploeger | 62/183 X |
| 2,242,588 | 2/1938 | McGrath | 237/2 |
| 2,516,094 | 7/1950 | Ruff | 62/129 |
| 2,721,728 | 10/1955 | Higgins | 257/9 |
| 2,801,524 | 8/1957 | Fifield | 62/183 X |
| 2,921,445 | 1/1960 | Ashley et al. | 62/218 X |
| 3,984,050 | 10/1976 | Gustafsson | 237/2 B |
| 3,989,183 | 11/1976 | Gustafsson | 62/238.6 X |
| 4,149,389 | 4/1979 | Hayes et al. | 62/335 X |
| 4,194,368 | 3/1980 | Bahel et al. | 62/238 |
| 4,199,955 | 4/1980 | Jonsson | 62/238.6 X |
| 4,238,931 | 12/1980 | Campbell | 62/238.1 X |
| 4,254,630 | 3/1981 | Geary | 62/238.1 X |

Primary Examiner—William E. Tapolcai, Jr.
Attorney, Agent, or Firm—Dowell & Dowell

[57] ABSTRACT

Heat is recovered in a medium at higher than normal condensing temperature of a refrigeration system by using two cascade connected refrigeration systems and heating the medium in isolated stages by refrigerant subcooling and refrigerant condensing stages of the higher temperature system.

4 Claims, 1 Drawing Figure

REFRIGERATION SYSTEM CONDENSER HEAT RECOVERY AT HIGHER TEMPERATURE THAN NORMAL CONDENSING TEMPERATURE

TECHNICAL FIELD

This invention relates to heating using heat pump systems interconnected in a cascade relationship.

BACKGROUND ART

It is well known that refrigeration systems have means for handling a refrigerant in such a way that heat is rejected from the system at a relatively high temperature and absorbed at a relatively low temperature. Provision can be made for making use of either or both of these conditions. Use of the heat rejecting portion of the system ordinarily leads to characterizing the system as a heat pump. The use of heat pumps has increased in recent years due to their efficiency in producing heat as compared with various other means.

The interconnection of two or more closed loop refrigeration systems in which the heat absorbing stage of one is in heat exchange relation with the heat rejecting stage of the other, is also well known in the art and is commonly termed a cascade system. One of the primary purposes of a cascade system is to permit the attaining of temperatures in the heat rejecting or heat absorbing stage of one of the systems that exceeds that which can be attained if only a single system is used with commonly available heat rejecting or heat absorbing loads. An example of a cascade coupled heat pump system for heating water is disclosed in the U.S. Pat. to Gustafsson No. 3,984,050. In it, water is heated by passing in heat exchange relationship with the condenser of one of the heat pump systems.

A heat pump water heater is also disclosed in the U.S. Pat. to Ruff No. 2,516,094. Other heaters using refrigeration systems are disclosed in the U.S. Pat. to Bahel et al Nos. 4,194,368, McGrath 2,242,588 and Buchanan 2,102,940.

SUMMARY OF THE INVENTION

The invention includes a pair of refrigeration or heat pump systems coupled in cascade relationship in which the system having the higher condensing temperature has its condenser isolated from a refrigerant subcooling stage and in which the medium, e.g. water, to be heated first flows in heat exchange relation with the subcooling refrigerant and then in heat exchange relation with the condensing refrigerant. The heated medium may have a portion in heat exchange relation with a load from which the medium is returned to flow with medium that has already been heated initially in the liquid subcooling means.

It is an object of the invention to provide a system and method whereby heat may be recovered from a cascade coupled refrigeration system at a temperature higher than a non-cascade system and in which the temperature is raised in separate stages thereby more closely permitting the attainment of a temperature approaching that of the system's condensing temperature.

These and other objects will become apparent from the following description in conjunction with the accompanying drawing.

DESCRIPTION OF THE PREFERRED EMBODIMENT

Figure 1:
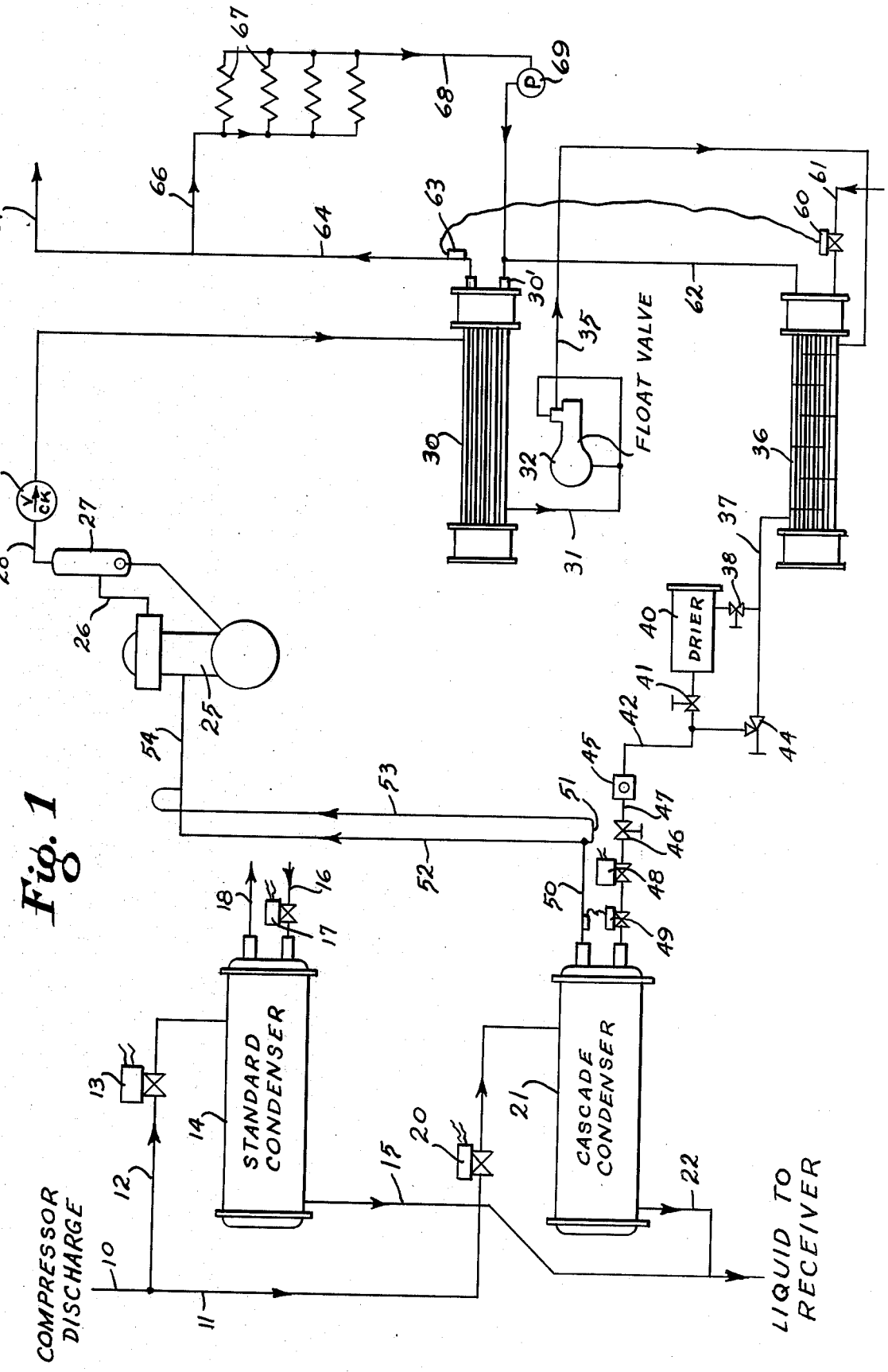
FIG. 1 is a diagrammatic representation of a system in accordance with the present invention.

With further reference to the drawing, there is disclosed a primary compression type refrigeration system having a compressor, not shown, which discharges gaseous refrigerant into a line 10 and branch lines 11 and 12. Branch line 12 is provided with a normally open solenoid operated valve 13 and is connected to a standard condenser 14. The condenser discharges liquid refrigerant through a discharge line 15 to a receiver and evaporator, not shown, from which the vaporized refrigerant is returned to the compressor. The standard condenser 14 is cooled by water or other liquid entering through line 16 under the control of a solenoid operated shutoff valve 17 and leaving via line 18. Any other condensing means may be used if preferred.

In order to recover the maximum heat from the conventional refrigeration system and to transfer that heat to a higher temperature level, an auxiliary refrigeration system is used which is of a type providing a higher temperature level at an acceptable pressure level. For the purpose of meeting this requirement, the water supply to the standard condenser 14 is shut off by means of the valve 17 and simultaneously solenoid operated valve 20 in line 11 is opened and solenoid operated valve 13 is closed, thus permitting the flow of gaseous refrigerant from the line 10 to enter a cascade condenser 21. Liquid refrigerant from the condenser 21 is discharged through a line 22 to the discharge line 15.

Simultaneously with the passage of refrigerant from the line 11 into the cascade condenser 21, the operation of the auxiliary refrigeration system is commenced. Thus, at this time, compressor 25 of the auxiliary system is started, discharging into line 26, oil separator 27, discharge line 28 and check valve 29 to the auxiliary cascade condenser 30. From the cascade condenser 30, the refrigerant liquid leaves through line 31 and liquid outlet regulator, or float trap 32 into line 35. Float trap 32 permits the passage of liquid only, which then passes through line 35 into liquid subcooler 36. After being subcooled, the liquid passes through line 37, valve 38 into dryer 40 and through valve 41 into line 42. Bypass line 43 having valve 44 is provided around the dryer.

From line 42 the liquid passes through sight glass 45, valve 46 in line 47 through solenoid operated valve 48 and thermal control valve 49 through the tubes of the primary cascade condenser 21, which tubes constitute the evaporator of the auxiliary system. From condenser 21 the gaseous refrigerant leaves by line 50 into loop 51 and lines 52 and 53 to line 54 and to the compressor 25.

When the operation of compressor 25 is started, valve 60 in make-up liquid line 61 is opened to permit the flow of water or any other liquid to be heated into the refrigerant liquid subcooler 36 and out by line 62 to the tubes 30' of the condenser 30. The operation of valve 60 is controlled by sensing bulb 63 on the outlet line 64 from the tubes 30'. From line 64 the heated liquid may pass through line 65 to a use stage where relatively high temperature liquid is required, such as for washing industrial products. A branch line 66 from line 64 supplies liquid to a series of heat exchangers 67 from which it is returned by line 68 through pump 69 to the refrigerant condenser 30.

While various refrigerants may be used in the two systems, the following is an example of operation in which ammonia (NH₃) is used in the first described system and refrigerant R-12 is used in the auxiliary system. Thus, in the basic system, with ammonia at 95.5° F. condensing level and 15.3 PSIG inlet and 10° superheat entering the compressor, under such conditions, the ammonia will have 617.8 BTU's per lb. and an entropy of 1.3497 and will, after compression, maintain the same entropy and a heat content of 694.3 BTU's per lb. The heat removal necessary to obtain a saturated liquid at 95° is 694.3, less 149.4, or 544.9 BTU's per lb.

By the use of refrigerant R-12 for removal of the heat of condensation in the auxiliary cascade condenser, the condensing temperature level in the auxiliary system is such that 80° water can be heated to 120° temperature with low heat input compared to that which would be required if direct resistance, electric or conventional oil or gas heat were employed.

In an R-12 refrigeration system, condensing at 130° F., the nominal saturated liquid temperature is 130° F. However, an appropriate heat exchange system, such as described herein, will attain a 90° R-12 liquid temperature from heat exchange with the 80° water which is being heated in steps to 120° F. The subcooling of the R-12 from the level of 130° F. to 90° F. greatly reduces the flow rate into the primary cascade condenser 21 in which ammonia is being condensed.

The R-12 compressor 25, with an inlet pressure of 90.3 PSIG (84.05° F.) and with an inlet temperature of 100° F. has a BTU content of 88.446 and an entropy of 0.16883. When compressed to a pressure of 185.3 PSIG (131.74° F.), the entropy remaining constant, the BTU content is increased to 93.583 per lb. Thus, the difference between 93.583 and 88.446 is 5.137 BTU's per lb. of R-12 vapor that is compressed.

The R-12 refrigerant must remove 544.9 BTU's per lb. of ammonia in the cascade condenser 21. To accomplish this requires calculation of the flow rate of the R-12 prevailing conditions. Thus, the heat content of 1 lb. of R-12 vapor at 85° F. is 85.75 BTU's per lb. and the heat content of the liquid R-12 at 90° is 28.713 BTU's per lb., the difference equalling 57.019 BTU's per lb. Thus, 544.9 BTU's per lb. of ammonia divided by 57.09 BTU's indicates a required flow rate of 9.56 lbs. per minute of R-12 in primary condenser 21.

In the R-12 auxiliary condenser 30, the heat content of the entering refrigerant vapor is 93.583 BTU's per lb. The heat content of liquid R-12 at 90° is 28.713 BTU's. Thus, the difference indicates an availability of 68.7 BTU's for each pound flowing. With a flow rate of 9.56 lbs. per minute, 620.16 BTU's is available per minute in the R-12 auxiliary condensing-subcooling system for heating water or other medium to 120° F. temperature level. The total theoretical heat input to obtain the 620.16 BTU's per minute in the condenser is 9.56 lbs. per minute multiplied by 5.137 BTU's input for compressing one pound of R-12 vapor which equals 49.11 BTU input in order to obtain the 620.16 BTU's output.

The data used above is taken from standard refrigerant tables and is theoretical without considering the normal system losses. The relatively small BTU input results from known efficiency of the heat pump system. In the present invention, such efficiency is greatly improved by the separate liquid subcooling of the liquid refrigerant in the cascade subcooler 36.

I claim:

1. A medium heating system comprising, primary and auxiliary refrigeration systems, said auxiliary refrigeration system having first refrigerant condensing means and first refrigerant evaporating means, said primary refrigeration system having second refrigerant condensing means connected to said first refrigerant evaporating means whereby heat rejected by the refrigerant in said second refrigerant condensing means is absorbed by refrigerant in said first refrigerant evaporating means, said auxiliary refrigeration system having its condensing means connected by a line to feed liquid refrigerant to refrigerant liquid subcooling means, trap means in said line permitting liquid only to flow to said liquid subcooling means after condensation in said first refrigerant condensing means, whereby substantially only heat of condensation is given up in said first refrigerant condensing means, means for bringing medium to be heated, seriatim, into heat exchange relation with refrigerant in said liquid subcooling means, and then into heat exchange relation with refrigerant in said first refrigerant condensng means, whereby said medium is initially heated in said liquid subcooling means to a temperature below that prevailing in said first refrigerant condensing means, and then is further heated in said first refrigerant condensing means to a higher temperature approaching the condensing temperature in said first refrigerant condensing means.

2. The invention of claim 1, in which a first portion of medium from said first refrigerant condensing means is fed to a first station for use, and a second portion is fed to a second station for supplying heat to a load where its temperature is reduced to a level approximating the temperature of the medium leaving said liquid subcooling means and is then recirculated through said first refrigerant condensing means.

3. The invention of claim 1, and means for controlling the flow of subcooled refrigerant to said second refrigerant condensing means.

4. The invention of claim 1, and means for controlling the flow of medium to said subcooling means and thereby controlling the flow of medium to said first refrigerant condensing means.

* * * * *